INVENTOR.
EDWARD H. EPPRECHT
BY Herman L. Gordon
ATTORNEY

May 1, 1956  E. H. EPPRECHT  2,743,914
GAS-LIQUID MIXING APPARATUS
Filed Sept. 27, 1950  8 Sheets-Sheet 3

INVENTOR.
EDWARD H. EPPRECHT
BY Herman L. Gordon
ATTORNEY

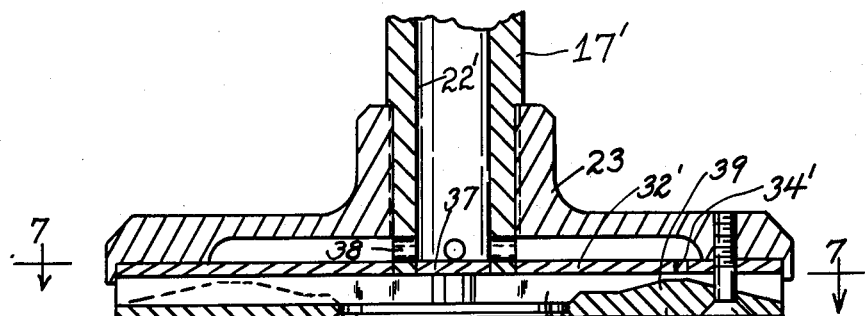
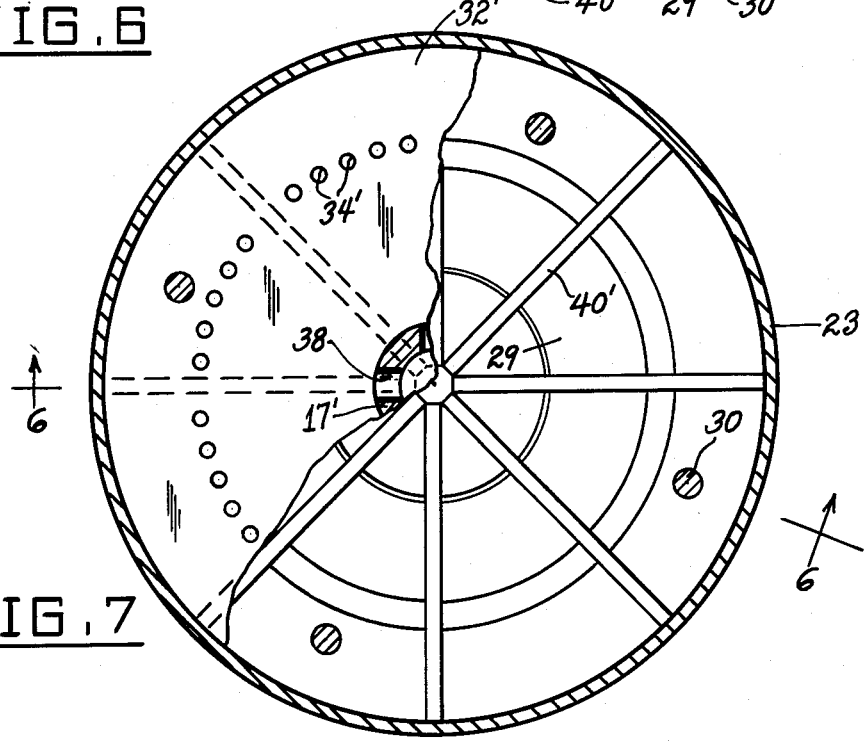
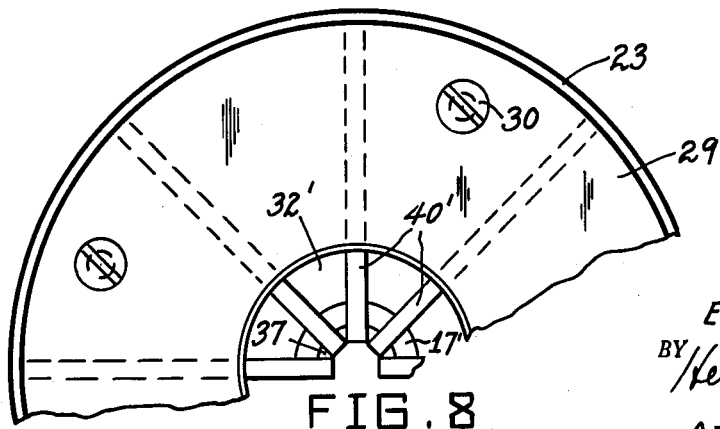

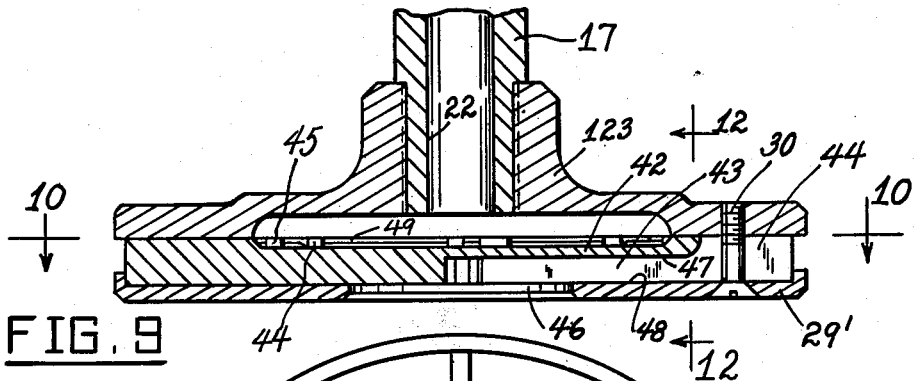
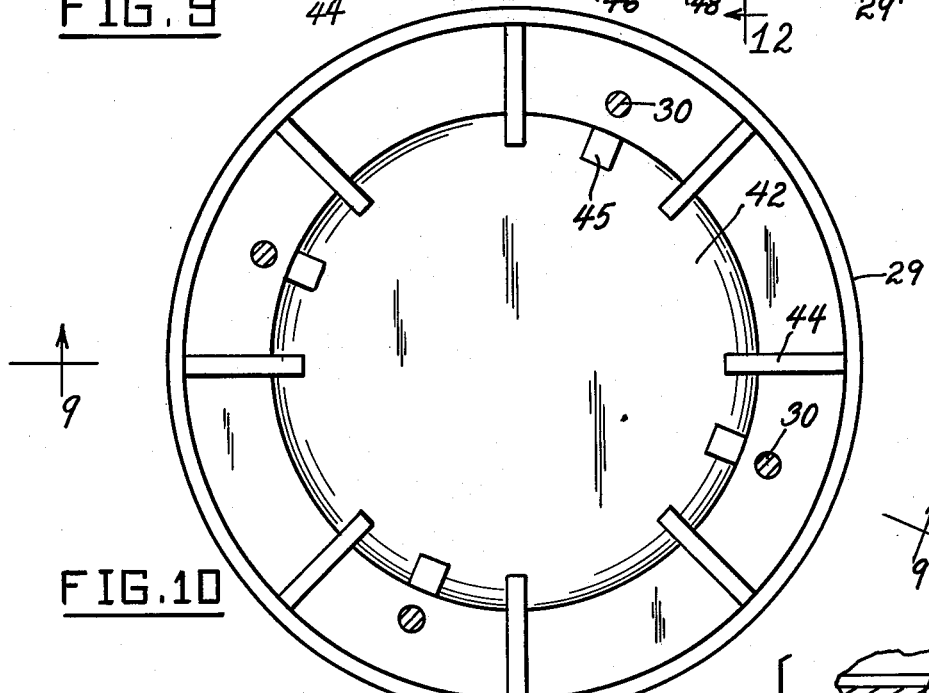
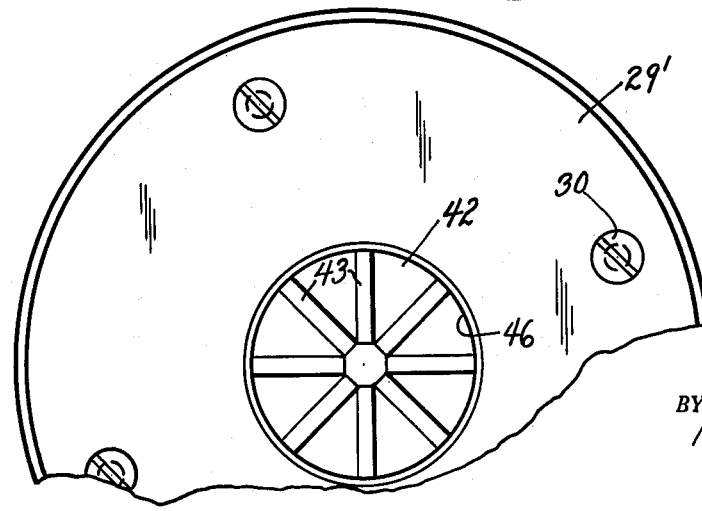

May 1, 1956 E. H. EPPRECHT 2,743,914
GAS-LIQUID MIXING APPARATUS
Filed Sept. 27, 1950 8 Sheets-Sheet 6

INVENTOR.
EDWARD H. EPPRECHT
BY Herman L. Gordon
ATTORNEY

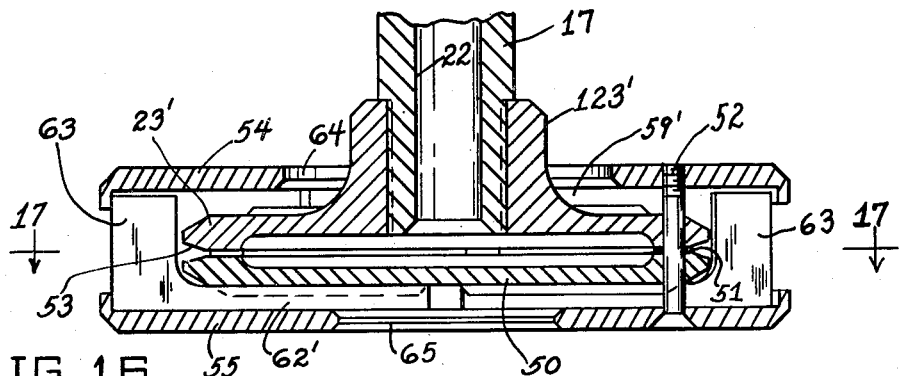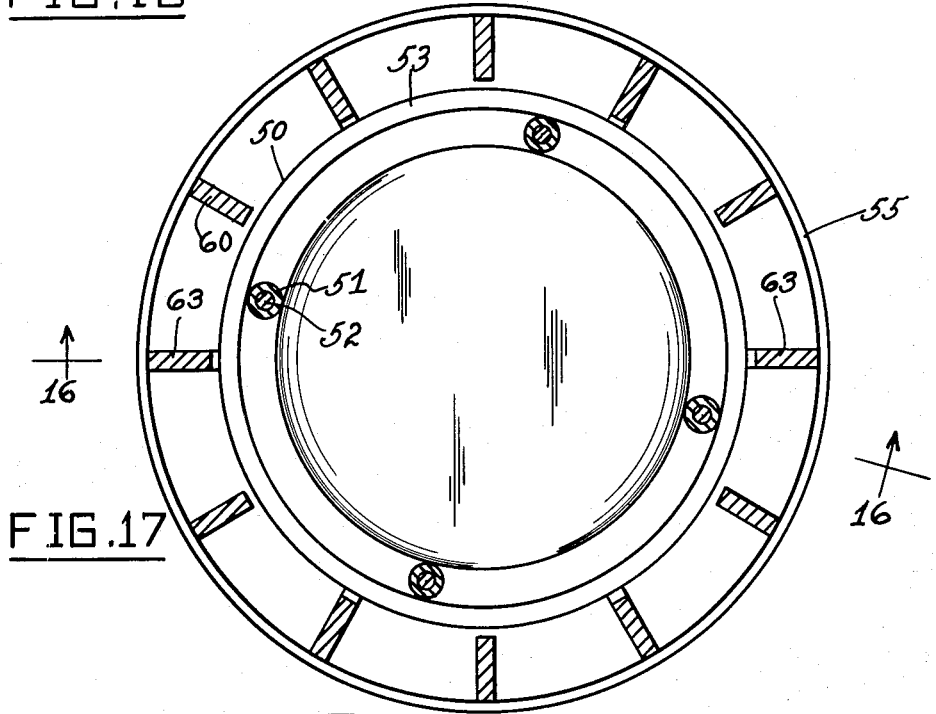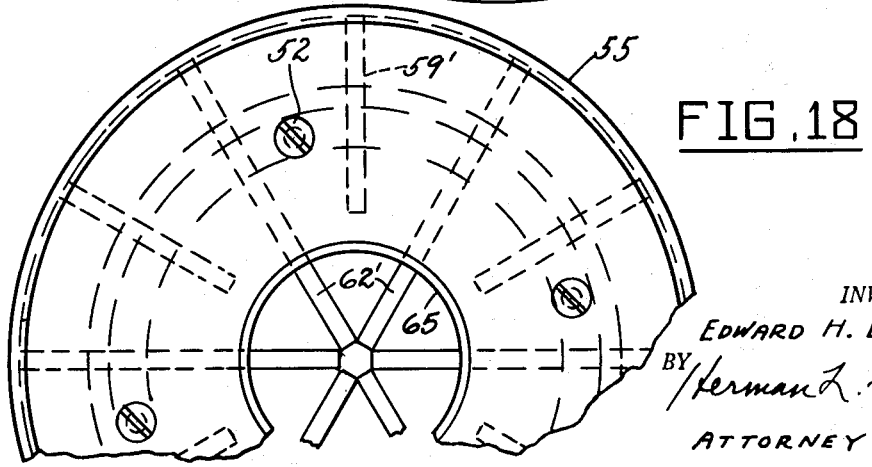

May 1, 1956 E. H. EPPRECHT 2,743,914
GAS-LIQUID MIXING APPARATUS
Filed Sept. 27, 1950 8 Sheets-Sheet 8

INVENTOR.
EDWARD H. EPPRECHT
BY Herman L. Gordon
ATTORNEY

United States Patent Office 2,743,914
Patented May 1, 1956

2,743,914

GAS-LIQUID MIXING APPARATUS

Edward H. Epprecht, Takoma Park, Md., assignor to American Instrument Company, Inc., Silver Spring, Md.

Application September 27, 1950, Serial No. 187,037

4 Claims. (Cl. 261—87)

This invention relates to mixing apparatus, and more particularly to improved apparatus for mixing gases with liquids.

A main object of the invention is to provide a novel and improved mixing apparatus which is simple in construction, which is efficient in operation, and which provides homogeneous distribution of a gas through a liquid with which it is to be mixed.

A further object of the invention is to provide an improved mixing apparatus for mixing a gas with a liquid, said apparatus involving relatively inexpensive parts, being very durable in construction, and providing thorough distribution of gas in a liquid with a maximum amount of agitation and mechanical disturbance of the liquid.

A still further object of the invention is to provide an improved mixing apparatus for mixing a gas with a liquid, said apparatus employing an improved and novel arrangement of suction-producing means whereby the gas is aspirated into the liquid continuously during the operation of the apparatus, the suction required for aspiration being produced by moving portions of the apparatus relative to the liquid and providing means which develops reduced pressure in the liquid responsive to such motion.

Further objects and advantages of the invention will become apparent from the following description and claims, and from the accompanying drawings, wherein:

Figure 6 is a vertical cross-sectional view taken through the lower portion of the rotor of a further modification of the mixing apparatus of the present invention, said view being taken on line 6—6 of Figure 7.

Figure 7 is a cross-sectional view taken on line 7—7 of Figure 6.

Figure 8 is a fragmentary bottom plan view of the rotor shown in Figures 6 and 7.

Figure 9 is a vertical cross-sectional view through the lower portion of a still further modified form of mixing rotor according to the present invention, said view being taken on line 9—9 of Figure 10.

Figure 10 is a cross-sectional view taken on line 10—10 of Figure 9.

Figure 11 is a fragmentary bottom plan view of the mixing rotor shown in Figures 9 and 10.

Figure 12 is a cross-sectional detail view taken on line 12—12 of Figure 9.

Figure 16 is a fragmentary vertical cross-sectional view taken through the lower portion of a still further modified form of mixing rotor according to the present invention, said view being taken on line 16—16 of Figure 17.

Figure 17 is a horizontal cross-sectional view taken on line 17—17 of Figure 16.

Figure 18 is a fragmentary bottom plan view of the modified form of mixing rotor shown in Figures 16 and 17.

Figure 1:
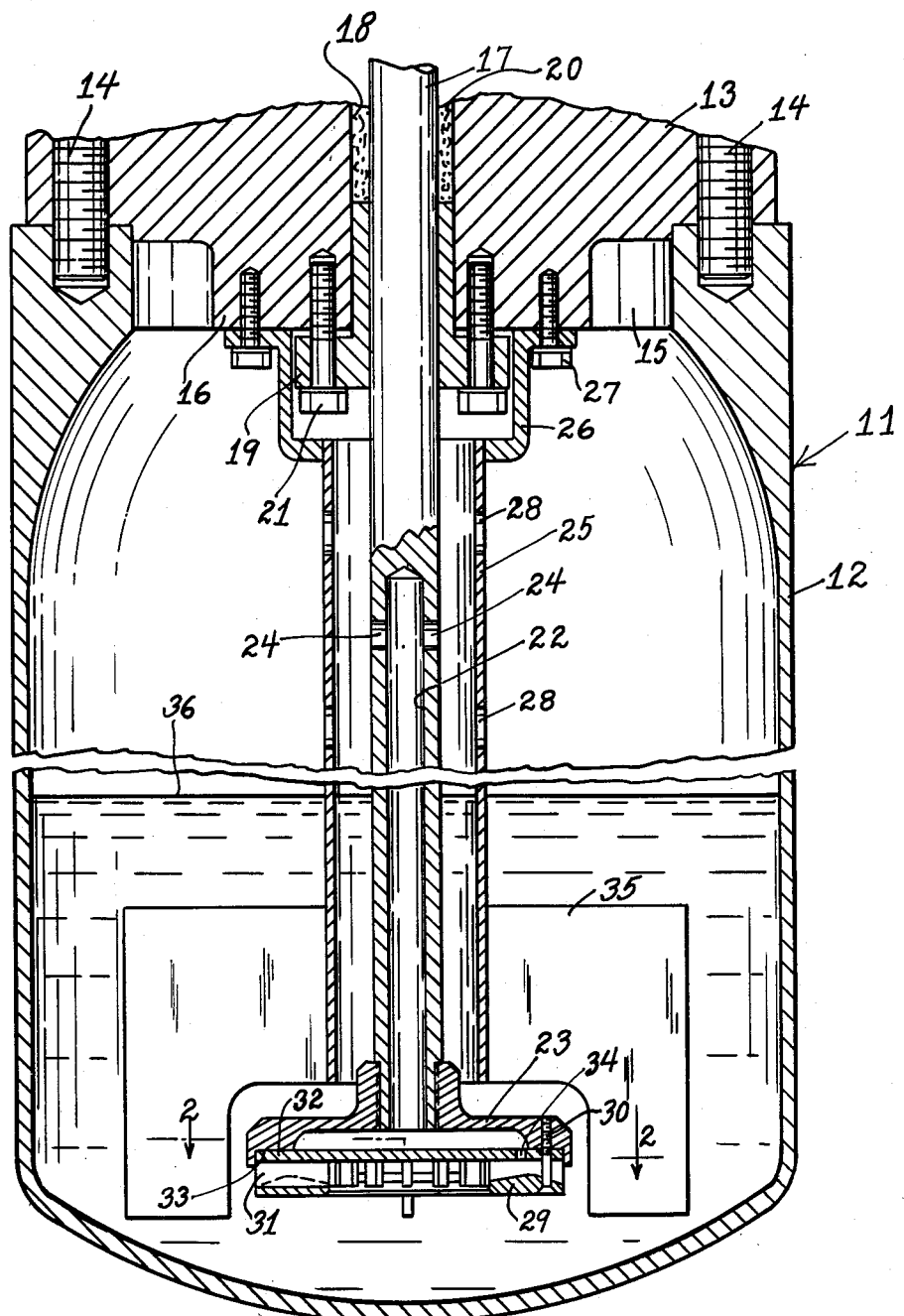
Figure 1 is a vertical cross-sectional view taken through one form of mixing apparatus constructed in accordance with the present invention, said view being taken on line 1—1 of Figure 2.
Figure 2:
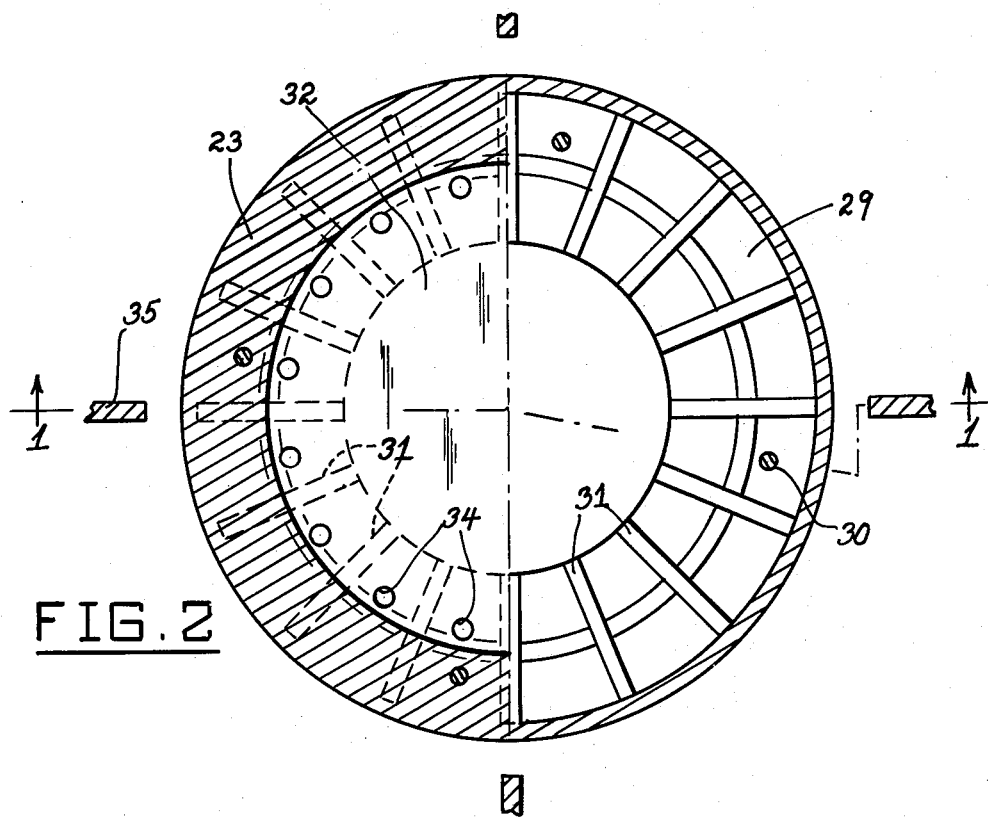
Figure 2 is an enlarged cross-sectional view taken on line 2—2 of Figure 1.

Referring to the drawings, and more particularly to Figures 1 and 2, 11 generally designates a mixing apparatus constructed in accordance with the present invention, said apparatus comprising a mixing chamber 12, which may be in the form of a conventional autoclave, secured to a supporting body 13 by means of bolts, shown for example at 14. As shown in Figure 1, the vessel 12 has a circular top opening 15 and the body 13 has a boss portion 16 which projects through the opening 15. Designated at 17 is a shaft member which extends axially through a bore 18 in the member 13, a suitable sealing gland 19 being provided in the boss portion 16, said sealing gland being forced against suitable packing 20 in the bore 18 by means of bolts 21 which extend through a flange on the gland member 19 and are threaded into the boss portion 16, as shown. The shaft 17 is thereby sealingly and rotatably engaged in the member 13.

As shown in Figure 1, the shaft member 17 is formed with an axial bore 22. Secured to the lower end of the shaft member 17 is a dome-like member 23 whose interior communicates with the bore 22, as shown in Figure 1. The shaft member 17 is formed adjacent the upper end portion of the bore 22 with a plurality of openings 24 which provide communication between the space external to the shaft 17 and the interior of the bore 22. Designated at 25 is a cylindrical sleeve which is disposed around the shaft 17 and is coaxial therewith, said sleeve being secured to an annular drum-shaped member 26 which is bolted to the boss member 16, as by the bolts 27. The upper portion of the sleeve member 25 is formed with apertures 28 which establish communication between the interior of the sleeve member and the space in the upper portion of the vessel 12.

Designated at 29 is an annular disc member which is secured to the rim portion of the dome-like member 23 by a plurality of spaced bolts 30, said bolts being arranged at equal angular distances around the axis of the shaft member 17. The annular disc member 29 has secured thereto a plurality of evenly spaced radial vertical wall elements 31, defining radial passages. Designated at 32 is a circular disc which is interposed between the top radial edges of the wall members 31 and the annular surface of a recessed seat 33 formed in the bottom rim of the dome-like member 23.

As shown in Figures 1 and 2, the disc 32 is formed with respective apertures 34, each aperture being located adjacent the intermediate portion of a respective passage defined between an adjacent pair of wall members 31. As will be further seen from Figure 1, the annular disc 29 is substantially flat on its bottom surface but is formed with a top surface which is bevelled both inwardly and outwardly from its intermediate portion to define a generally venturi-shaped cross-section with respect to the disc 32, the aperture 34 associated with each above-mentioned radial passage being located adjacent the constricted intermediate portion of the passage.

In operation, the liquid and gas to be mixed are first introduced into the vessel 12 in any suitable manner, and the body 13 is sealingly secured to the top rim of vessel 12, as by the bolts 14. The shaft 17 is connected to a suitable driving means, for example, the output shaft of a slow-speed motor. As the rotor defined by the shaft 17 and the elements secured thereto revolves, liquid flows inwardly through the central opening of the annular disc member 29 and enters the radial passages defined between the radial wall elements 31. The liquid flows outwardly through said radial passages by centrifugal force, and as the liquid passes through the venturi-like portions of said radial passages, reduction in pressure is developed adjacent the constricted passage portions as the liquid is moved radially outwardly therethrough. This reduction in pressure provides a substantial degree of suction which causes gas from the upper portion of the vessel 12 to be aspirated into the liquid as said liquid is moved outwardly through the passages. The gas in the upper portion of the vessel flows through the openings 28 and through the apertures 24 into the bore 22, and then flows downwardly through said bore into the space defined within the dome-like member 23. The gas then flows through the respective apertures 34 into the aspirator passages, wherein the gas is mixed into the liquid as the liquid flows outwardly through said passages. It will be readily apparent that the rotary motion of the shaft causes liquid to move outwardly from the bottom portion of the rotor through said passages by centrifugal force, the flow of the liquid through the above-mentioned aspirator passages providing the necessary reduction in pressure to produce the aspirating action.

In order to increase turbulence and mechanical agitation of the liquid, a plurality of radial baffle plates 35 are secured to the lower end portion of the sleeve member 25, said baffle plates serving to prevent the formation of a vortex around the sleeve member as the shaft 17 rotates.

As will be evident from Figure 1, the liquid which is to be treated, designated at 36, is disposed in the vessel 12 to a depth sufficient to cover the lower portion of the rotor and the lower portion of the sleeve 25, whereby the dome-like member 23 and the elements carried thereby are completely immersed in the liquid. The gas which is to be mixed with the liquid fills the upper portion of the vessel 12 and is freely accessible to the interior of the bore 22 through the openings 28 and 24. As the gas is distributed through the liquid the level of the mixture rises until finally a completely homogeneous mixture of gas and liquid is produced.

Figure 3:
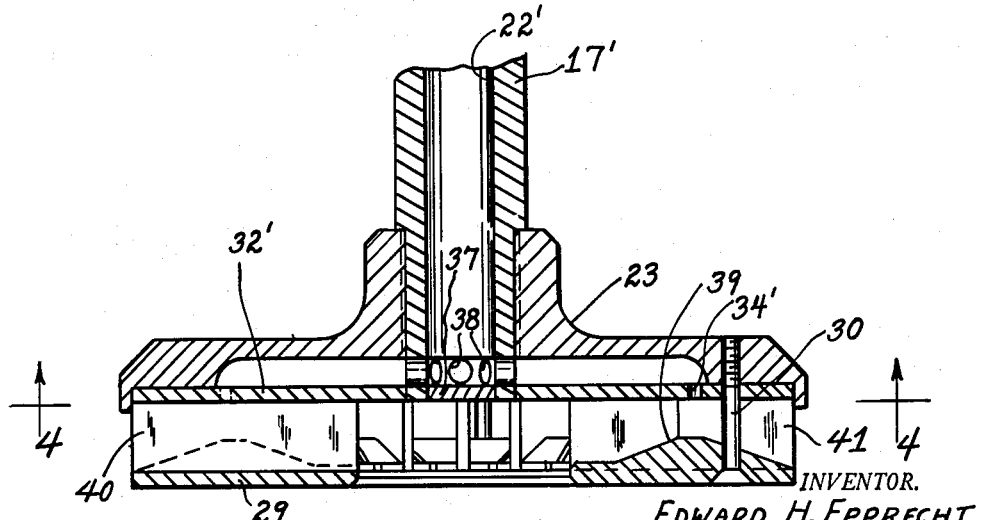
Figure 3 is a fragmentary cross-sectional view taken vertically through the lower portion of a modified form of mixing rotor for a mixing apparatus according to the present invention, said view being taken on line 3—3 of Figure 4.
Figure 4:
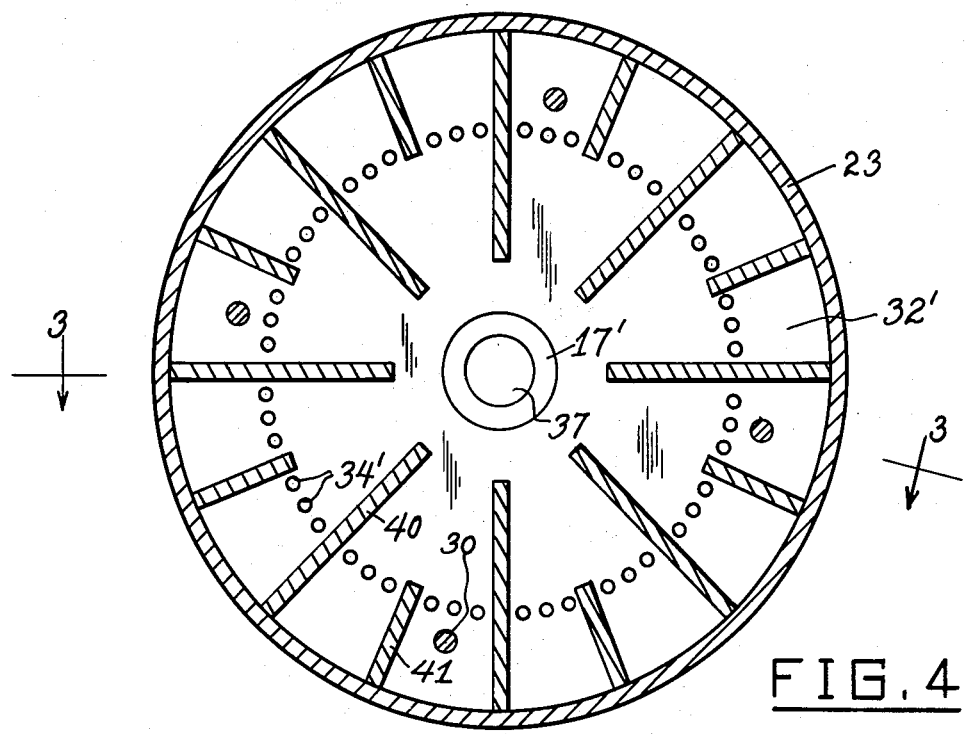
Figure 4 is a cross-sectional view taken on line 4—4 of Figure 3.
Figure 5:
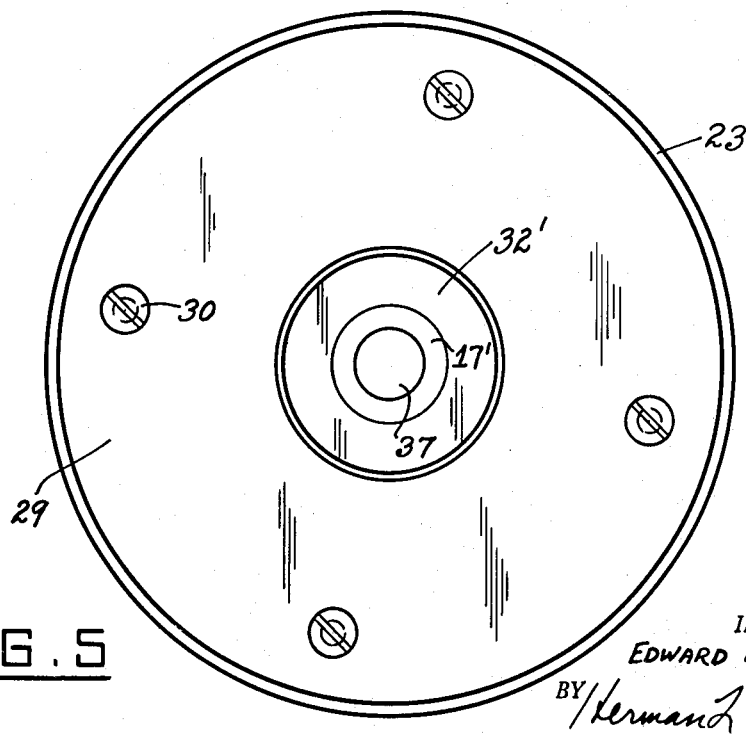
Figure 5 is a bottom plan view of the mixing rotor of Figures 3 and 4.

Referring now to Figures 3, 4 and 5, a modified form of mixing rotor is disclosed which is adapted to be employed in the autoclave or mixing vessel 12 of Figure 1 in place of the rotor therein illustrated. In Figures 3, 4 and 5 the rotary shaft is designated at 17′, said shaft having a bore 22′. The dome-like member 23 is secured to the end of the shaft 17′, said shaft extending through the disc member 32′ secured to the bottom of the member 23 and being closed off by a suitable cover element 37 welded or otherwise rigidly secured therein. The lower end portion of the shaft 17′ is formed with a plurality of apertures 38 which provide communication between the bore 22′ and the space defined beneath the dome-like member 23 between said dome-like member and the disc member 32′. As in the form of the invention shown in Figures 1 and 2, an annular member 29 is secured to the dome-like member 23 by bolts 30, said annular member having the annular mound formation, shown at 39, defining the generally venturi-like radial passages with respect to the disc member 32′. Designated at 40 and 41 are respective radial plate members secured between the disc 32′ and the annular member 29, said radial plate members alternating, the plate members 40 being of substantial length and the plate members 41 being approximately one half the length of the plate members 40. The disc 32′ is formed with the circularly arranged apertures 34′, a plurality of apertures being included in each of the radial passages defined between the respective wall elements 40 and 41, and the apertures being located at radial distances from the axis of the shaft 17′ which are slightly greater than the radial distances of the inner edges of the radial wall elements 41, as shown in Figure 4.

In operation, the modified form of rotor shown in Figures 3, 4 and 5, provides a similar type of mixture of the gas with the liquid by aspiration of the gas into said liquid as is obtained with the rotor employed in Figures 1 and 2, the liquid moving outwardly through the radial passages defined by the respective wall members 41 and 40 and the disc 32′ and annular member 29, a reduction in pressure being produced as the liquid flows past the constricted intermediate portions of said radial passages. This reduction in pressure causes gas to be drawn into the liquid by suction from the space in the dome-like member 23. As in the embodiment of the invention illustrated in Figures 1 and 2, the liquid moves outwardly by centrifugal force and the aspirating effect produced by the passage of the liquid through the venturi-like radial passages causes the gas to be entrained with the liquid.

As shown in Figure 3, the apertures 34′ are located adjacent the crest portion of the mound 39, namely adjacent the constricted portions of the radial venturi passages.

In the form of rotor shown in Figures 6, 7 and 8, the elements are generally similar to those of Figures 3, 4 and 5 except that the radial wall elements, shown at 40′ extend inwardly to positions of contact with each other, as shown in Figure 7, and all of said radial wall elements 40′ are equal in length. As in the form of the invention illustrated in Figures 3, 4 and 5, a plurality of apertures 34′ are provided in the disc 32′ for each of the radial passages defined between successive radial wall elements 40′. The operation of the rotor of Figures 6, 7 and 8 is similar to that of the two previously-described forms of rotor according to the present invention in that liquid flows into the inner space beneath the disc 32′ and thence into the radial passages defined by the successive radial wall elements 40′, and through the venturi-like passages defined therein by the mound element 39 provided on the annular disc member 29. The openings 34′ are located adjacent the constricted portions of said venturi-like passages and allow gas to be aspirated into the liquid due to the reduction in pressure produced as the liqued moves outwardly through the venturi-like passages by centrifugal force.

Referring now to Figures 9, 10, 11 and 12, a further form of rotor according to the present invention is disclosed. As shown in Figures 9 to 12, the hollow shaft 17 has secured to its lower end the dome-like member 123, and secured to the rim of said dome-like member is the annular bottom disc 29′. Interposed between the annular bottom disc 29′ and the rim of the dome-like member 123 is a downwardly dished disc member 42 which is formed with the radial vertical wall elements 43. As shown in Figure 9, said wall elements are enlarged in height at their outer portions, desginated at 44, whereas the bottom edges of the wall elements are substantially in the same horizontal plane as and engage the upper surface of the annular bottom disc 29′. The top edges of the radial wall elements 43 engage the bottom surface of the rim of the dome-like member 123 and are clamped thereagainst by the securing bolts 30. The peripheral portion of the concave disc 42 is formed at equally spaced intervals therearound with the lug elements 45, said lug elements being preferably radially aligned with the securing bolts 30, as shown in Figure 10, and the top surfaces of the lugs 45 being substantially coplanar with the top edges of the outer portions 44 of the radial wall elements 43. As shown in Figures 9 and 11, the radial wall elements 43 extend inwardly to positions wherein they substantially contact each other, as in the embodiment of the rotor described in connection with Figures 6, 7 and 8. The central aperture of the disc member 29', shown at 46, defines the inlet opening for the liquid, the radial passages defined between the walls 43 having relatively constricted portions located between the surfaces 47 and 48 of the disc 42 and the annular member 29', as shown in Figure 9. The rim of the dome-like member 123 is maintained in spaced relation with respect to the rim of the disc member 42 by the lugs 45 and by the top portions of the outer sections 44 of the wall elements 43. Therefore, respective passages 49 are defined at the periphery of the disc 42, said passages providing communication between the space within the dome-like member 123 and the outer portions of the radial passages defined between the successive wall elements 43. From Figure 9 it will be seen that the passages 49 communicate with the aforesaid radial passages substantially adjacent to the constricted portions of said radial passages, whereby gas may be aspirated into the liquid as it flows through said radial passages in substantially the same manner as in the previously described forms of the invention. As in said previously described embodiments, the liquid flows outwardly in the rotor through the radial passages by centrifugal force and the outward movement of the liquid produces a reduced pressure as the liquid emerges from the constricted portions of the radial passages into the enlarged outer portions thereof, said reduction in pressure providing suction which aspirates the gas into the liquid.

Figure 13:
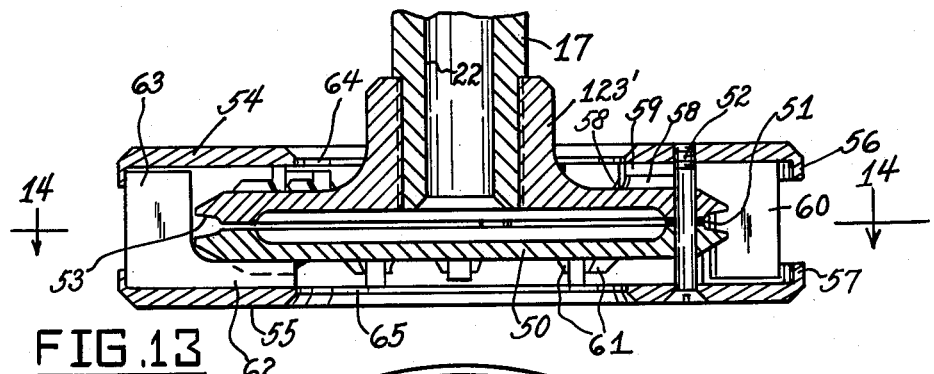
Figure 13 is a fragmentary vertical cross-sectional view taken through the lower portion of a still further modified form of mixing rotor according to the present invention, said view being taken on line 13—13 of Figure 14.
Figure 14:
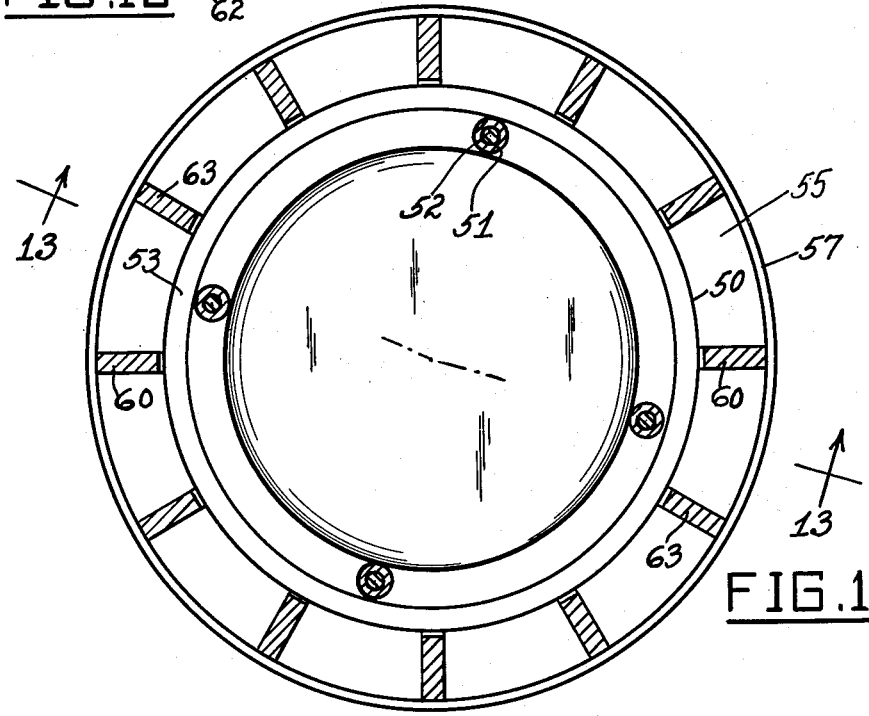
Figure 14 is a cross-sectional view taken on line 14—14 of Figure 13.
Figure 15:
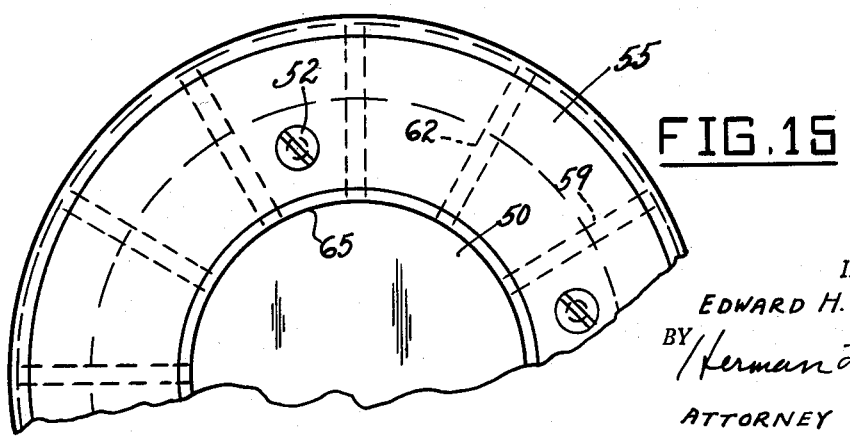
Figure 15 is a fragmentary bottom plan view of the modified form of mixing rotor of Figures 13 and 14.

Referring now to Figures 13, 14 and 15, a further modification of a rotor according to the present invention is disclosed. Secured to the end of the shaft 17 is a dome-like member 123', and secured to the rim of said dome-like member in opposing relation thereto is the circular dished member 50, the opposing surfaces of the members 123' and 50 being separated by suitable washers 51 encircling the fastening bolts, shown at 52. As shown in Figure 13, the rim portions of the members 123' and 50 are tapered so as to define outwardly flaring annular spaces 53 between said rim portions. Designated at 54 and 55 are respective annular flat ring elements which are disposed respectively above and below the dome-like member 123' and the dished member 50 in the manner shown in Figure 13. The member 54 is formed with a peripheral flange 56 and the member 55 is similarly formed with a peripheral flange 57. The upper surface of the member 123' is formed with respective pairs of radial lugs 58 which receive therebetween the radial leg portions 59 of generally L-shaped radial partition elements 60. The outer portions of the elements 60 depend adjacent the peripheral edges of the members 123' and 50, and define radial partitions beyond the peripheries of members 123' and 50. Similarly, the bottom surface of the member 50 is formed with respective pairs of radial lugs 61 which receive the leg portions 62 of generally L-shaped wall elements 63, the outer portions of said wall elements 63 rising vertically adjacent the peripheral edges of the members 123' and 50, and defining radial partitions similar to the partitions 60. The partitions thus defined by the members 60 and 63 alternate in sequence. The clamping bolts 52 exert force on the members 54 and 55 which causes the leg portions 62 of the members 63 and the leg portions 59 of the members 60 to be firmly clamped between the respective pairs of retaining lugs 61, 61 and 58, 58, as well as forcing the dished member 50 upwardly toward the member 123'. However, the rim portions of the members 123' and 50 are maintained separated by the washers 51, thereby defining passages through which gas may emerge from the hollow shaft 17 into the liquid. The central apertures 64 and 65 of the members 54 and 55 define inlet passages for the liquid, and the respective leg elements 59 and 62 define radial passages whereby the liquid may flow into the space between the annular members 54 and 55 past the peripheral portions of the members 123' and 50. As the liquid flows past said peripheral portions, the passages for the liquid become substantially increased in area, whereby a reduction in pressure is produced adjacent the flaring space 53 at the gas escape apertures. This reduction in pressure produces aspiration of the gas into the liquid as the liquid flows outwardly between the members 54 and 55 by centrifugal force responsive to the rotation of the shaft 17.

Referring now to Figures 16, 17 and 18, an arrangement generally similar to that disclosed in Figures 13 to 15 is illustrated except that the leg portions of the wall members, shown respectively at 62' and 59', are substantially longer than in the form of the invention of Figures 13 to 15, the lower leg portions 62' extending inwardly to positions wherein they substantially contact each other, as shown in Figure 18. However, the operation of the rotor of Figures 16, 17 and 18 is substantially similar to that of the rotor of Figures 13, 14 and 15 in that liquid flows into the rotor through the inlet openings 64 and 65 and flows through the relatively constricted passages defined between the opposing surfaces of members 54 and 123' and members 55 and 50, and thence emerges into the passage portions of greatly increased cross-sectional area outwardly adjacent the flaring space 53 between the peripheral portions of the members 123' and 50. The outward movement of the liquid by centrifugal force through said relatively constricted passage portions provides the reduction in pressure adjacent the gas outlet space 53 which produces aspirating action of the gas into the liquid as the liquid moves into the outer portion of the rotor.

Figures 19, 20, 21:
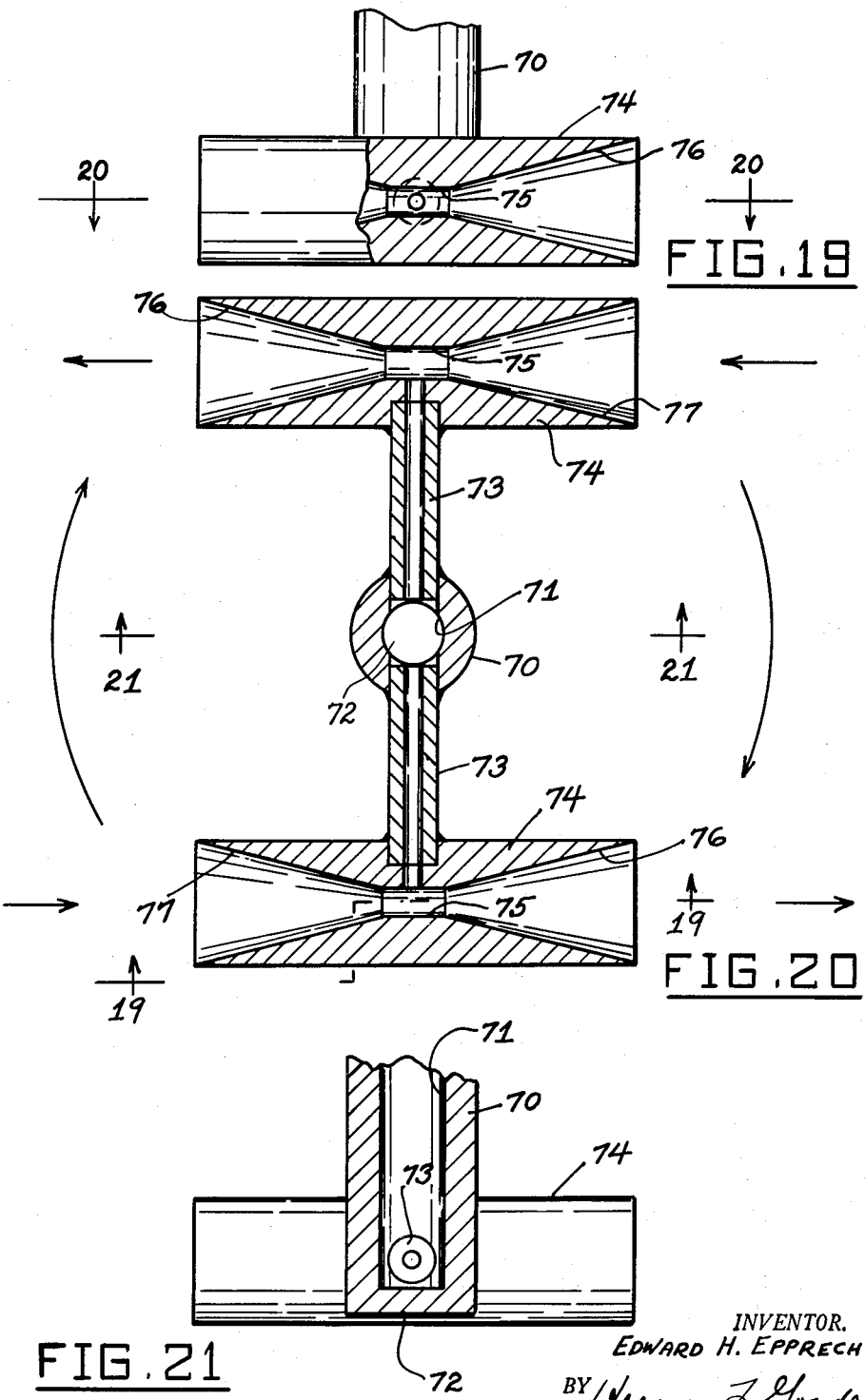
Figure 19 is a vertical cross-sectional view taken through the lower portion of a still further modified form of mixing rotor according to the present invention, said view being taken on line 19—19 of Figure 20.
Figure 20 is a horizontal cross-sectional view taken through the modified form of mixing rotor of Figure 19, said view being taken on line 20—20 of Figure 19.
Figure 21 is a cross-sectional view taken on line 21—21 of Figure 20.

Referring now to Figures 19, 20 and 21, a further modified form of mixing rotor according to the present invention is disclosed, said rotor comprising a hollow shaft 70, corresponding to the shaft 17 of Figure 1, the bore of the shaft being shown at 71. As shown in Figure 21, the shaft 70 is closed off at its bottom end, the bottom end wall of the shaft being shown at 72. Secured to the lower end portion of the shaft are the diametrically opposing tubular, radial arms 73, 73, said arms being of equal length, and secured to the ends of the arms 73 at right angles thereto are the respective venturi members 74. As shown, each venturi member 74 comprises a cylindrical body formed with the respective oppositely flaring end passages 76 and 77 which are connected at the intermediate portion of the member 74 by the relatively constricted passage 75. The tubular arms 73 are secured to the member 74 substantially adjacent the locations of the passages 75 and are in communication therewith, as shown in Figure 20. As above mentioned, the venturi members 74, 74 are located in a common plane extending at right angles to the shaft 70, and therefore rotate circumferentially around the axis of said shaft responsive to rotation of the shaft. Therefore, liquid enters the members and flows therethrough, the relative motion of the venturi members with respect to the liquid producing a reduction in pressure as the liquid is displaced relatively past the constricted intermediate passages 75 of the venturi members. This reduction in pressure causes suction, which produces aspiration of the gas from the bore 71 of the hollow shaft 70, through the hollow arms 73 into the liquid as the liquid is displaced relative to the venturi passages in the members 74. In distinction to the previously described embodiments of the invention, the aspiration of the gas is produced by relative movement between the venturi elements 74 and the liquid, rather than by outward centrifugal movement of the liquid through the venturi members. However, in both cases, a reduction in pressure is produced adjacent the constricted portions of the venturi elements whereby the desired aspiration takes place.

As shown in Figure 20, if the shaft 70 is rotated clockwise, as viewed in said figure, the upper venturi member 74 moves to the right relative to the liquid, which provides the same effect as motion of the liquid to the left through the venturi member, and similarly, the lower venturi member 74 moves to the left, which provides the same effect as motion of the liquid through the venturi member to the right. Obviously, any desired number of venturi members may be employed, each venturi member being connected to and communicating with the hollow shaft 70 by a tubular arm similar to the tubular arm 73 shown in Figures 19, 20 and 21.

While certain specific embodiments of apparatus for mixing gas with liquid have been disclosed in the foregoing description, it will be understood that various additional modifications within the spirit of the invention may occur to those skilled in the art. Therefore it is intended that no limitations be placed on the invention except as defined by the scope of the appended claims.

What is claimed is:

1. An apparatus for mixing gas and liquid comprising a closed vessel adapted to receive the liquid and gas to be mixed, a hollow shaft extending sealingly and rotatably through the upper wall portion of the vessel, the upper portion of the shaft being apertured, whereby the bore of the shaft is in communication with the space in the upper portion of the vessel, a disc member secured to the lower end portion of said shaft, and an aspirator secured to said disc member at a location spaced from the shaft axis, said aspirator comprising a body formed with a passage having a relatively constricted intermediate portion and outwardly flaring opposite ends communicating with said intermediate portion, said disc member being formed with a further passage connecting the bore of the shaft to said relatively constricted passage portion of the aspirator, the respective opposite ends of the aspirator body being open to the lower portion of the vessel, whereby rotation of the shaft causes liquid in the lower portion of the vessel to pass through said aspirator and to aspirate gas from the upper portion of the vessel into the liquid.

2. An apparatus for mixing gas and liquid comprising closed vessel adapted to receive the liquid and gas to be mixed, a hollow shaft extending sealingly and rotatably through the upper wall portion of the vessel, the upper portion of the shaft being apertured, whereby the bore of the shaft is in communication with the space in the upper portion of the vessel, a disc member secured to the lower end portion of said shaft, and an aspirator secured to said disc member at a location spaced from the shaft axis, said aspirator comprising a body formed with a passage having a relatively constricted intermediate portion and outwardly flaring opposite ends communicating with said intermediate portion, said passage being substantially radially directed with respect to the shaft axis, said disc member being formed with a further passage connecting the bore of the shaft to said relatively constricted passage portion of the aspirator, the respective opposite ends of the aspirator body being open to the lower portion of the vessel, whereby rotation of the shaft causes liquid in the lower portion of the vessel to pass through said aspirator and to aspirate gas from the upper portion of the vessel into the liquid.

3. In an apparatus for mixing gas and liquid, a rotor comprising a hollow shaft, a dome-like member axially secured to the end of said shaft and communicating with the bore thereof, and a disc member secured to the rim of said dome-like member, said disc member having a plurality of radial aspirator passages arranged around its periphery, each aspirator passage having a relatively constricted intermediate portion and the disc member being formed with apertures connecting the constricted intermediate portions of the aspirator passages with the interior of said dome-like member.

4. In an apparatus for mixing gas and liquid, a rotor comprising a hollow shaft, a dome-like member axially secured to the end of said shaft and communicating with the bore thereof, said dome-like member having a depending annular rim, a disc member coaxial with said dome-like member and extending adjacent said rim, a plurality of radial wall elements carried by the underside of said disc member and having widened outer end portions projecting beyond the disc member and secured to the rim of said dome-like member, defining restricted passages between said rim and said disc member, said wall elements extending inwardly beneath said disc member, and an annular disc presenting secured to the bottom edges of said wall elements, thereby defining a plurality of radial passages extending past said restricted passages.

References Cited in the file of this patent

UNITED STATES PATENTS

| 1,242,445 | Ittner | Oct. 9, 1917 |
| 1,345,596 | Howland | July 6, 1920 |
| 1,583,591 | Greenawalt | May 4, 1926 |
| 1,771,321 | Snow | July 22, 1930 |
| 1,779,181 | McDonald | Oct. 21, 1930 |
| 2,104,349 | MacComy | Jan. 4, 1938 |
| 2,343,274 | Bailey, Jr. et al. | Mar. 7, 1944 |
| 2,448,590 | Günther | Sept. 7, 1948 |

FOREIGN PATENTS

| 218,637 | Switzerland | Apr. 16, 1942 |
| 466,143 | Great Britain | May 24, 1937 |